UNITED STATES PATENT OFFICE 2,374,283

1-PHENOXY-3-HYDROXY-PROPANONES-(2) AND A PROCESS FOR THEIR MANUFACTURE

Adolf Grün and Willy Stoll, Basel, Switzerland, assignors to the firm of J. R. Geigy A. G., Basel, Switzerland No Drawing. Application November 25, 1941, Serial No. 420,424. In Switzerland December 17, 1940

8 Claims. (Cl. 260—574)

Dioxy acetone diethers are already known (diethoxy acetone from Bull. (3) 1, 12 and Ann. 269, 30, other diethers from the U. S. patent application Ser. No. 369,356). However, the simple ethers, compounds of the general formula

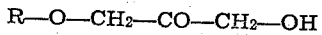

which can be derived diagrammatically from dihydroxy acetone by replacing a hydroxylic hydrogen by an ether radical (a hydrocarbon radical) were hitherto not yet accessible. In the same way as these ether-keto-alcohols, their esters have also remained unknown.

For the production of the compounds of these two classes, the etherification or etherification and esterification of the originating substance, as was to be expected, at least for technical purposes, hardly comes into consideration. According to this invention, however, they are obtained from the halogen derivatives of acetonyl ethers (3-halogen-1-hydroxy acetone ethers) by exchange of the halogen atom for an acyloxy group and further exchange of this group for hydroxyl in the sense of the reaction sequence I to III,

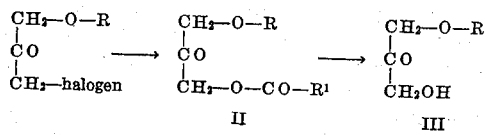

R and R$^1$=suitable ether radicals, such as alkyl or aryl radicals.

The conversion of the halogen compound I into the ester II is possible by the action of carboxylic acid salts, in the simplest way from alkali formate or acetate, the further change from ester to alcohol III by replacing the acetone ether alcohol by another alcohol, that is to say by means of an alcoholysis; both reaction stages may also be carried out in one operation. The following equation reproduces the reaction for one case:

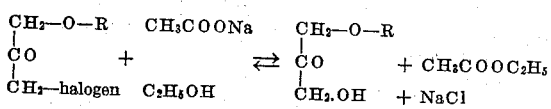

In any case the total reaction does not proceed to a sufficient extent under the usual conditions for the halogen exchange, only by boiling the methanolic or ethyl alcoholic solution. However the surprising observation was made that the reaction equilibrium, by increasing the temperature to above 100° C., up to about 150° C., was displaced many times from left to right, and even quantitative reaction can thus be obtained. That not only can the reaction take place practically completely, but the products thereof remain as obtained almost entirely unaltered and can be collected in a very satisfactory yield, is very surprising.

The instability of the already known simple α-keto alcohols has been known for a long time. They are liable to rearrangement with the formation of enols, inner semi acetals, cyclic bimers; they can also otherwise isomerise or disproportionate. Such reactions and their subsequent reactions were naturally to be feared more probably to a greater extent with the new ether-keto-alcohols. In addition, it appeared very easily possible, almost unavoidably, that in the case of the reaction of aryloxy-acetonyl-halides with carboxylic acid salts, whether in the presence or absence of alcohols intramolecular condensations with the splitting off of hydrogen halide or water, the formation of benzofuran or benzopyran derivatives would be favoured in consequence of the required high temperatures. These by-reactions appear in fact to occur in many cases, but according to the present invention they never become the main reaction. Of course, it is also advantageous to allow the reaction to proceed in as neutral a medium as possible.

The process enables halogen acetonyl ethers to be converted directly into ether esters of dihydroxy acetone. It is even possible, as already mentioned, to arrive at the dihydroxy acetone mono ethers in one operation and to esterify these again. This is particularly advantageous for the production of acetol ether esters of inorganic acids, for example, of phosphoric acid, pyrophosphoric acid and so forth, or organic acids, the salts of which are less suitable for the direct interreaction with the halogen acetonyl ethers.

The process has proved as applicable within a wide range. As ether radicals normal and branched alkyls, alkenyls, aryls, aralkyls and other cyclic radicals of various types, which may even be substituted by hetero atoms in any way, may be introduced.

As ester components, acyls of all kinds of oxygenated acids come into consideration, whether of inorganic or organic, mono or polybasic acids. The starting or intermediate products may be obtained from mono ethers of glycerine halogen hydrins by oxidation.

It has furthermore been found that it is also possible to arrive at the above described ketone-ether-esters in another way, namely by oxidation of the glycerine-ether-ester with a free mid-positioned hydroxyl group of the general formula V

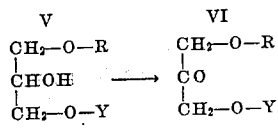

R=a suitable ether radical, Y=acyl radical of an oxygen-containing organic or inorganic acid.

The process formulated by the above diagram is desirable in many respects, in singular cases an almost indispensable supplement of the other method of production. In that method temperatures of about 100° C. and above must be maintained, to exchange the α-position halogen atom for hydroxyacyl, at which temperatures various halogen-containing starting products, such as those with high molecular aryloxy groups, are already inclined to intra molecular condensations. During the oxidation of the corresponding glycerine-aryl-ether-esters, however, which takes place at a low temperature, by-reactions of this type do not occur. On the other hand the halogen-free esters, even those of aryloxy acetols with high molecular aryl residues, can be brought uninjured to high temperatures, without undergoing nuclear condensations. Further it is particularly advantageous that according to the present invention the esters with inorganic acids of dihydroxyacetone mono ethers are obtained in one operation from the corresponding glycerine-ether-esters, whereas it is not possible to produce these (in the same way as the esters of carboxylic acids) so simply in one operation from the halogen acetonyl-ethers by exchange of the halogen atom for the anion of an inorganic acid.

The dihydroxy acetone mono ethers as well as their esters are suitable for technical purposes, especially for use in the industry of pharmaceutical products, partly as such, partly as intermediate products for other preparations.

The present invention is illustrated by the following examples. The parts are by weight, unless otherwise stated.

*Example 1*

72 parts of 1-ethoxy-3-chloro-propanone-2 (water clear liquid, soluble in water and organic solvents, boiling point 16 mm. 76–79° C.) are added to a solution of 66 parts of water-free potassium formate in about 400 parts of methanol and heated for 15 hours finally to 110–120° C. After expelling the methanol about 50 parts = about 87% of the quantity calculated for ethoxy-acetol (1-ethoxy-3-hydroxy-propanone-2) remain. The compound having a boiling point 14 mm. 109–111° C. is colorless and odorless, soluble in water; the solution reduces slowly when cold, faster when heated, ammoniacal silver nitrate, but not Fehling's solution.

Instead of formate there can be used acetates, propionates, benzoates of sodium, potassium, ammonium, alkaline earths and the like.

1-ethoxy-3-chloro-propanone-2 is produced as follows:

100 parts of glycerine monochlorohydrinethyl ether (1-ethoxy-3-chloro-propanol-2, boiling point 740 mm. 180° C.) are stirred with a solution of 72 parts of crystallised sodium bichromate and 85 parts of water at 0°–5° C. For 6 hours the mixture of 80 parts of sulfuric acid and 50 parts of water is allowed to flow in. Stirring is continued whilst cooling until the chromic acid has been consumed, extraction is effected with ether and the extracted solution is neutralised by means of bicarbonate, then sodium carbonate. After expelling the solvent 89 parts of 1-ethoxy-3-chloro-propanone-2 remain.

In the same way as ethoxy-chloro-propanol it is possible to oxidise methoxy-chloro-propanol or the homologous alkoxy compounds of all kinds for instance propyl, butyl, amyloxy compounds, and the ketones can be further reacted as above described. The alkyls of the alkoxy groups may also be substituted by inert atom groups, for example again by alkoxyl, such as methoxy, ethoxy and so on, by carboxalkyl and many others.

*Example 2*

Methyl alcoholic formate solution is reacted under the conditions maintained in the first example with 1-propenoxy-3-chloro-propanone-2 and produces the allyloxy-acetol (1-propenoxy-3-hydroxy-propanone-2), boiling point 17 mm. = 118–120 C., a weakly yellowish liquid, without allyl-like odor, which decolorises bromine and iodine solutions, reduces ammoniacal silver solution substantially more energetically than the ethyl derivative, on heating slowly reduces even the Fehling's solution.

The corresponding bromopropenoxy compound possesses analogous properties.

1-propenoxy-3-chloro-propanone-2 is produced in the following manner: A mixture of 150 parts of glycerine chloro-hydrin-allyl ether (1-propenoxy-3-chloro-propanol-2, boiling point 22 mm. 101–103° C.), 101 parts of sodium bichromate and 80 parts of water is treated gradually at 0° C. with the mixture of 110 parts of sulfuric acid and 70 parts of water. After complete reduction of the chromic acid 128 parts of the crude product, i. e. over 86% of the theoretical amount, are isolated by exhaustive extraction, purified by deacidifying and distilling at boiling point 17 mm. 85–90° C.

*Example 3*

75 parts of 1-phenoxy-3-bromo-propanone-2, boiling point 1.5 mm. 131–133° C., obtained from 100 parts of 1-phenoxy-3-bromo-propanol-2, boiling point 13 mm. 162–163° C., by oxidation under the above conditions, react with methyl alcoholic formate or acetate solution with quantitative separation of potassium bromide and the formation of phenoxy-acetol (1-phenoxy-3-hydroxy-propanone-2), white crystals, melting point 71° C., well soluble in water and organic solvents; the solution reduces ammoniacal silver nitrate, but Fehling's solution only very slightly.

The use of bromine derivatives as intermediate products does not offer any advantage relatively to that of chlorine compounds. When 1-phenoxy-3-chloropropanol-2, boiling point 18 mm. 149° C., is oxidised, the chlorinated ketone, boiling point 16 mm. 149–150° C. is obtained in better yield than in the case of the bromine analogue and with methanol and potassium formate or the like this can even produce almost quantitatively, reaction to phenoxy-acetol, whilst in any case the temperature is maintained somewhat higher, for example at 130° C.

In the same way as 1-phenoxy-3-bromo-propanol it is possible to oxidise 1-orthocresoxy-bromo-propanol, boiling point 13 mm. 166–167° C., to the ketone and work this up further.

*Example 4*

1-o-methoxyphenoxy-3-chloro-propanone-2 produces, according to the above directions in alcoholic solution, when reacted with formate (acetate), 1-o-methoxyphenoxy-3-hydroxy-propanone-2, as an aggregate of fine glass-clear needles, melting point 82° C.

1-o-methoxyphenoxy-3-chloro-propanone-2 is produced from glycerine monochlorohydrin-guaiacol ether (1-o-methoxy-phenoxy-3-chloro-propanol-2, a viscous colorless liquid, boiling point 1 mm. 150–151° C. by semi-reaction of glycerine-α,γ-dichlorohydrin with guaiacolate or by a round about method, but purer, by reacting epichlorohydrin with potassium guaiacolate and splitting up the epiguaiacoline so obtained by means of hydrochloric acid) by oxidation in a very good yield in the form of a less viscous, orange colored oil, boiling point 1.3 mm. 142–144° C.

The analogous ethoxy compound can be produced from the o-ethoxy phenol by the same reaction sequence as the guaiacol derivative.

*Example 5*

By reacting 1-amyl phenoxy-3-chloropropanone-2 under pressure with alcohol and formate and working up according to the directions in Example 1, the amyl-phenoxy-acetol is obtained, a very highly viscous, yellow liquid boiling point 1.7 mm. 180–181° C., clearly but only slightly soluble in cold water, easily soluble in diluted alcohols and other solvents.

The starting material is accessible as follows:

Amylphenol when reacted in alkaline solution with epichlorohydrin produces epi-amylphenyl-ine, boiling point 16 mm. 176/177° C., this on treatment and heating with hydrochloric acid (or even exactly similarly with hydrobromic acid) produces the glycerine chlorohydrin ether of amyl phenol, boiling point 2.5 mm. 164–165° C. By oxidation 1-amylphenoxy-3-chloro-propanone-2, boiling point 1.5 mm. 172–173° is obtained in excellent yield.

The other C-alkyl derivatives of epiphenyline, which can be produced from the corresponding C-alkyl phenols, for instance the methyl-, propyl-, butyl- and so on compounds, as well as the analogous arylated epiphenylines, obtainable from epichlorohydrin and the alkali compounds of hydroxydiphenyl, hydroxy phenyl-naphthyl and so forth, further C-aralkylated epiphenylines, for example from hydroxydiphenyl methane, hydroxy-phenylnaphthyl methane, hydroxy-diphenylethane, hydroxy stilbene and many others react in the same way as epi-amylphenyline.

*Example 6*

According to the particulars of Example 1, 1-m-diethylamino-phenoxy-3-chloropropanone-2 is reacted with formate and methyl alcohol in an autoclave. The crude product is first neutralised with mineral acid, the solution is purified by extraction, then by lengthy shaking with charcoal and finally the free base is separated; 1-(3'-diethylaminophenoxy-1')-3-hydroxy-propanone-2, a bright yellow oil, boiling point 1.5 mm. 187–189° C., easily soluble in acids and organic solvents. difficultly soluble in hot water, the solution when heated with ammoniacal silver nitrate produces a beautiful mirror.

The starting compound is produced as follows: N-diethyl-m-aminophenol is reacted with potassium hydroxide and epichlorohydrin in the same way as the non-aminated phenols and produces the epihydrin ether of diethyl-aminophenol absolutely pure, boiling point 1 mm. 160–161° C. (1 g. consumes for neutralisation 45.5 cc. n/10 acid, calculated 45.3 cc.). The compound or its hydrochloride is split up, by taking up a second molecule of hydrochloric acid, to the diethyl-amino-phenyl ether of glycerin chlorohydrin (1-m-diethyl-amino phenoxy-3-chloropropanol-2), a yellow-red oil, as mono acid base, sharply titratable (1 g. uses 39.8 cc. n/10 acid, calculated 39.9 cc.). The oxidation to the ketone is effected according to the process which has proved satisfactory with all the compounds of the series.

Instead of diethyl amino-phenol, other basic-substituted phenols may also be converted, according to the same reaction sequence, into the corresponding aminated aryloxy-acetols, for example dimethyl amino phenols and cresols, dimethyl amino methyl phenols and cresols (obtained from the phenols by means of formaldehyde and dimethyl amine), piperidylmethyl phenol, morpholinyl methyl phenol and cresol and many others.

*Example 7*

Into 1-guaiacoxy-3-chloro-propanone-2, heated to 80° C., the same quantity by weight of finely powdered, water-free potassium acetate is stirred gradually. Further stirring takes place whilst gradually increasing the temperature, periodically to 120–130° C. until the reaction has finished (i. e. until a sample of the reaction mixture when titrated indicates the calculated quantity of chlorine ion). The product is then extracted from the mixture of potassium chloride and excess acetate, the solution filtered, evaporated and the residue distilled. By quantitative reaction 1-(2'-methoxyphenoxy)-3-acetoxy-propanone-2 is obtained in excellent yield as a bright yellow liquid, boiling point 1.5 mm. 170–171° C. identical with the product obtained from the free acetol by acylating. The analogous ethoxy compound can be produced in exactly the same way. Propionate, butyrate, bromobutyrate, isovalerate, bromoisovalerate or salts of other aliphatic or aromatic carboxylic acids, such as for example of benzoic acid, alkyl benzoic acids, react like acetate or formate in the Examples 1–6 with the formation of the corresponding esters. Only the cheapest carboxylic acids possess a practical importance.

100 parts of (o-methoxy phenoxy)-acetoxy-propanone are dissolved in 1000–1500 parts of absolute methyl alcohol and the solution is kept at boiling by reflux for 12–15 hours. The resulting methyl acetate and the methanol excess are then distilled off. 76 parts remain (calculated about 78 parts) which after crystallisation exhibit the melting point (from ether) of pure o-methoxy phenoxy-acetol, melting point 82° C. The higher alcohols, ethyl, propyl, butyl alcohol and so on react like methanol in this alcoholysis reaction, but their use does not offer any advantage. Also in this case the cheapest alcohol, which is at disposal, is used advantageously.

*Example 8*

100 parts of 1-phenoxy-3-acetoxy-propanol-2 are dissolved in 300 parts of glacial acetic acid, cooling is effected to about 3° C. and whilst stirring mixing is carried out very slowly with a solution of 52 parts of chromium trioxide, 18 parts of water and 500 parts of glacial acetic acid. Stirring is continued until the chromic acid reaction disappears and thereupon water and acetic acid are expelled in vacuo. The residue is diluted with a little ether or the like, neutralised, dried, concentrated and distilled. The product, a yellowish liquid, boiling point 16 mm. 172–174° C. is identical with 1-phenoxy-3-acetoxy-propanone-2. On boiling its alcoholic solution by reflux for many hours, the free phenoxy-acetol, melting point 71° C., is formed in addition to ethyl acetate.

The starting product, 1-phenoxy-3-acetoxypropanol-2 is produced from glycerine-α-halogenhydrinphenyl ether by reacting with acetate, or from monophenyline by means of acetic acid chloride or anhydride, or from epiphenyline by the addition of acetic acid and heating, then purification by fractionation, boiling point 16 mm. 190° C.

The oxidation of butryl and isovaleryl-phenyl-line, produced by splitting up epiphenyline with butyric acid or isovaleric acid, is effected in exactly the same way.

What we claim is:

1. A process for the manufacture of a 1-phenoxy-3-hydroxypropanone-2, which comprises reacting an ether of a 1-hydroxy-3-halogen-2-propanone of the formula

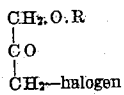

wherein R represents a radical of the group consisting of phenyl, alkylphenyl, alkoxyphenyl and alkylaminophenyl, with a salt of a carboxylic acid and with a monohydric alcohol.

2. A process for the manufacture of a 1-phenoxy-3-hydroxypropanone-2, which comprises reacting an ether of a 1-hydroxy-3-halogen-2-propanone of the formula

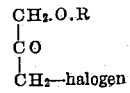

wherein R represents a radical of the group consisting of phenyl, alkylphenyl, alkoxyphenyl and alkylaminophenyl, with a salt of a carboxylic acid in the presence of a mono-hydric alcohol.

3. A process for the manufacture of a 1-phenoxy-3-hydroxypropanone-2, which comprises reacting an ether of a 1-hydroxy-3-halogen-2-propanone of the formula

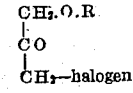

wherein R represents a radical of the group consisting of phenyl, alkylphenyl, alkoxyphenyl and alkylaminophenyl, with a salt of a carboxylic acid and then with a monohydric alcohol.

4. A process for the manufacture of 1-phenoxy-3-hydroxy-propanone-2, which comprises reacting 1-phenoxy-3-halogen-propanone-2 with an alkali metal formate in presence of methyl alcohol.

5. A process for the manufacture of 1-phenoxy-3-hydroxy-propanone-2, which comprises reacting 1-phenoxy-3-halogen-propanone-2 with an alkali metal acetate in presence of methyl alcohol.

6. A process for the manufacture of 1-(3'-diethylaminophenoxy-1')-3-hydroxypropanone-2, which comprises reacting 1-m-diethylaminophenoxy-3-chloropropanone-2 with an alkali metal formate in presence of methyl alcohol.

7. The compound of the formula

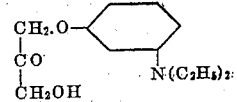

being a bright yellow oil, boiling point 1,5 mm. 187–189° C., easily soluble in acids and organic solvents difficultly soluble in hot water, the solution when heated with ammoniacal silver nitrate producing a beautiful mirror.

8. The compound of the formula

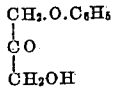

being white crystals, melting point 71° C., well soluble in organic solvents and water, the aqueous solutions reducing ammoniacal silver nitrate.

ADOLF GRÜN.
WILLY STOLL.